United States Patent
Chen et al.

(10) Patent No.: US 11,209,629 B2
(45) Date of Patent: Dec. 28, 2021

(54) CAMERA OPTICAL LENS COMPRISING SEVEN LENSES OF ++−−+−− OR ++−−−+− REFRACTIVE POWERS

(71) Applicant: AAC Optics Solutions Pte. Ltd., Singapore (SG)

(72) Inventors: Jia Chen, Shenzhen (CN); Lei Zhang, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 147 days.

(21) Appl. No.: 16/680,514

(22) Filed: Nov. 12, 2019

(65) Prior Publication Data

US 2020/0409104 A1    Dec. 31, 2020

(30) Foreign Application Priority Data

Jun. 29, 2019    (CN) .......................... 201910581375.4

(51) Int. Cl.
*G02B 13/00* (2006.01)
*G02B 9/64* (2006.01)
*G02B 1/04* (2006.01)

(52) U.S. Cl.
CPC ........... *G02B 13/0045* (2013.01); *G02B 9/64* (2013.01); *G02B 1/041* (2013.01)

(58) Field of Classification Search
CPC .............................. G02B 13/0045; G02B 9/64
See application file for complete search history.

(56) References Cited

FOREIGN PATENT DOCUMENTS

JP    59228220 A    * 12/1984    .............. G02B 9/62

OTHER PUBLICATIONS

JP-59228220-A translation (1984).*

* cited by examiner

*Primary Examiner* — Wen Huang
(74) *Attorney, Agent, or Firm* — W&G Law Group

(57) ABSTRACT

The present disclosure discloses a camera optical lens including a first lens, a second lens, a third lens, a fourth lens, a fifth lens, a sixth lens and a seventh lens. The camera optical lens further satisfies following conditions: $1.51 \leq f1/f \leq 2.50$; $1.70 \leq n5 \leq 2.20$; $0.00 \leq f3/f4 \leq 2.00$; $3.00 \leq (R13+R14)/(R13-R14) \leq 10.00$; and $1.70 \leq n6 \leq 2.20$; where f denotes focal length of the optical camera lens; f1 denotes focal length of the first lens; f3 denotes focal length of the third lens; f4 denotes focal length of the fourth lens; n5 denotes refractive index of the fifth lens; n6 denotes refractive index of the sixth lens; R13 denotes curvature radius of an object side surface of the seventh lens; and R14 denotes curvature radius of an image side surface of the seventh lens.

20 Claims, 7 Drawing Sheets

CAMERA OPTICAL LENS COMPRISING SEVEN LENSES OF ++−−+−− OR ++−−−+− REFRACTIVE POWERS

FIELD OF THE PRESENT INVENTION

The present invention relates to the field of optical lens, and more particularly, to a camera optical lens suitable for handheld terminal devices, such as smart phones and digital cameras, and imaging devices, such as monitors or PC lenses.

DESCRIPTION OF RELATED ART

With the emergence of smart phones in recent years, the demand for miniature camera lens is increasing day by day, but in general the photosensitive devices of camera lens are nothing more than Charge Coupled Device (CCD) or Complementary Metal-Oxide Semiconductor Sensor (CMOS sensor), and as the progress of the semiconductor manufacturing technology makes the pixel size of the photosensitive devices become smaller, plus the current development trend of electronic products towards better functions and thinner and smaller dimensions, miniature camera lenses with good imaging quality therefore have become a mainstream in the market. In order to obtain better imaging quality, the lens that is traditionally equipped in mobile phone cameras adopts a three-piece or four-piece lens structure. Also, with the development of technology and the increase of the diverse demands of users, and as the pixel area of photosensitive devices is becoming smaller and smaller and the requirement of the system on the imaging quality is improving constantly, the five-piece, six-piece and seven-piece lens structures gradually appear in lens designs. There is an urgent need for ultra-thin and wide-angle camera lenses with good optical characteristics and fully corrected chromatic aberration.

DETAILED DESCRIPTION OF THE EXEMPLARY EMBODIMENTS

In order to make the objects, technical solutions, and advantages of the present invention more apparent, the embodiments of the present invention will be described in detail below. However, it will be apparent to the one skilled in the art that, in the various embodiments of the present invention, a number of technical details are presented in order to provide the reader with a better understanding of the invention. However, the technical solutions claimed in the present invention can be implemented without these technical details and various changes and modifications based on the following embodiments.

Embodiment 1

Figure 1:
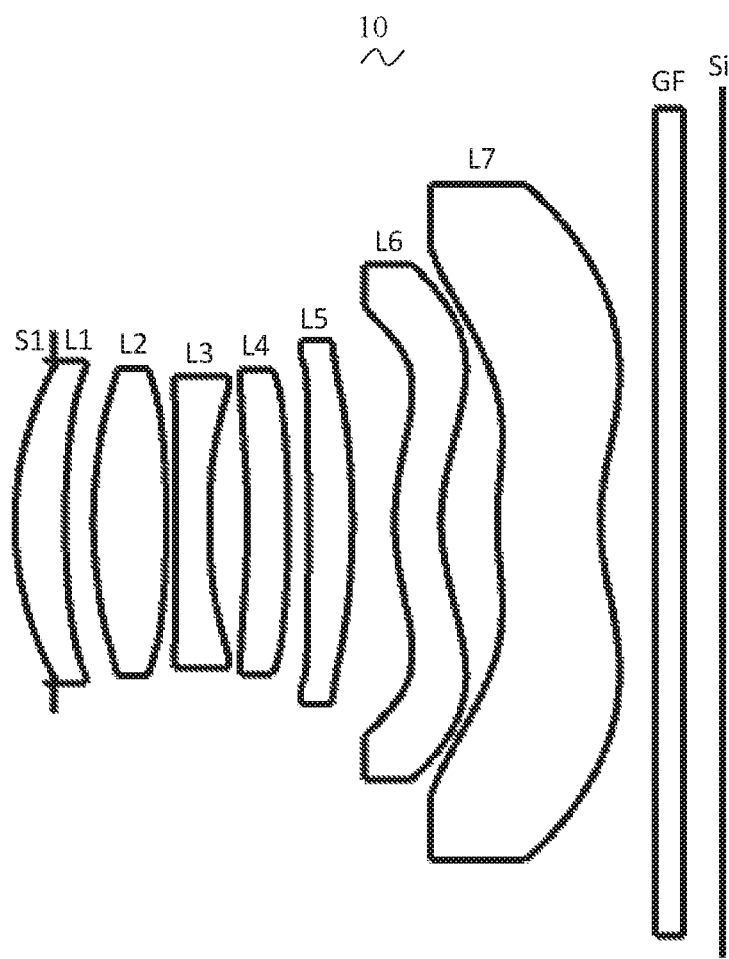
FIG. 1 is a schematic diagram of a structure of a camera optical lens in accordance with Embodiment 1 of the present invention.

As referring to the accompanying drawings, the present invention provides a camera optical lens 10. FIG. 1 shows the camera optical lens 10 according to embodiment 1 of the present invention. The camera optical lens 10 comprises 7 lenses. Specifically, from an object side to an image side, the camera optical lens 10 comprises in sequence: an aperture S1, a first lens L1, a second lens L2, a third lens L3, a fourth lens L4, a fifth lens L5, a sixth lens L6 and a seventh lens L7. Optical elements like optical filter GF can be arranged between the seventh lens L7 and an image surface Si.

The first lens L1 is made of plastic material, the second lens L2 is made of plastic material, the third lens L3 is made of plastic material, the fourth lens L4 is made of plastic material, the fifth lens L5 is made of glass material, the sixth lens L6 is made of glass material, the seventh lens L7 is made of plastic material.

Here, a focal length of the camera optical lens 10 is defined as f, and a focal length of the first lens L1 is defined as f1. The camera optical lens further satisfies the following condition: $1.51 \leq f1/f \leq 2.50$, which defines the positive refractive power of the first lens L1. If the value of f1/f exceeds the lower limit of the above condition, although it is beneficial for developing toward ultra-thin lenses, the positive refractive power of the first lens L1 would be too strong to correct an aberration of the camera optical lens, and it is bad for wide-angle development of lenses. On the contrary, if the value of f1/f exceeds the upper limit of the above condition, the positive refractive power of the first lens L1 becomes too weak to develop ultra-thin lenses.

A refractive index of the fifth lens L5 is defined as n5. The camera optical lens further satisfies the following condition: $1.70 \leq n5 \leq 2.20$, which defines the refractive power of the fifth lens L5. The value of the refractive index within this range benefits for the development of ultra-thin lenses, and it is also beneficial for the correction of the aberration. Preferably, the following condition shall be satisfied, $1.71 \leq n5 \leq 2.16$.

A focal length of the third lens L3 is defined as f3, and a focal length of the fourth lens L4 is defined as f4. The camera optical lens further satisfies the following condition: $0.00 \leq f3/f4 \leq 2.00$, which defines a ratio of the focal length f3 of the third lens L3 and the focal length f4 of the fourth lens L4, so that the sensitivity of the camera optical lens can be effectively reduced and the imaging quality can be enhanced furtherly. Preferably, the following condition shall be satisfied, $0.01 \leq f3/f4 \leq 2.00$.

A curvature radius of an object side surface of the seventh lens L7 is defined as R13, and a curvature radius of an image side surface of the seventh lens L7 is defined as R14. The camera optical lens further satisfies the following condition: $3.00 \leq (R13+R14)/(R13-R14) \leq 10.00$, which defines a shape of the seventh lens L7. When the value is within the range, as the development of ultra-thin and wide-angle lens, it benefits for solving the problems, such as correcting an off-axis aberration. Preferably, the following condition shall be satisfied, $3.04 \leq (R13+R14)/(R13-R14) \leq 9.98$.

A refractive index of the six lens L6 is defined as n6. The camera optical lens further satisfies the following condition: $1.70 \, n6 \leq 2.20$, which defines the refractive power of the six lens L6. The value of the refractive index within this range benefits for the development of ultra-thin lenses, and it also benefits for correcting the aberration. Preferably, the following condition shall be satisfied, $1.71 \leq n6 \leq 2.16$.

A total optical length from an object side surface of the first lens L1 to the image surface Si of the camera optical lens 10 along an optical axis is defined as TTL. When the focal length of the optical camera lens, the focal length of the first lens, the focal length of the third lens, the focal length of the fourth lens, the refractive index of the fifth lens, the refractive index of the sixth lens, the curvature radius of an object side surface of the seventh lens, and the curvature radius of an image side surface of the seventh lens meet the above conditions, the camera optical lens 10 has the advantage of high performance and meets the design requirement of low TTL.

In the embodiment, the object side surface of the first lens L1 is convex in a paraxial region, an image side surface of the first lens L2 is concave in the paraxial region, and the first lens L1 has positive refractive power.

A curvature radius of an object side surface of the first lens L1 is defined as R1, and a curvature radius of an image side surface of the first lens L1 is defined as R2. The camera optical lens further satisfies the following condition: $-11.43 \leq (R1+R2)/(R1-R2) \leq -1.55$. This condition reasonably controls a shape of the first lens, so that the first lens can effectively correct a spherical aberration of the system. Preferably, the following condition shall be satisfied, $-7.14 \leq (R1+R2)/(R1-R2) \leq -1.93$.

An on-axis thickness of the first lens L1 is defined as d1. The camera optical lens further satisfies the following condition: $0.04 \leq d1/TTL \leq 0.14$, which benefits for developing ultra-thin lenses. Preferably, the following condition shall be satisfied, $0.06 \leq d1/TTL \leq 0.11$.

In the embodiment, an object side surface of the second lens L2 is convex in the paraxial region, and the second lens L2 has positive refractive power.

The focal length of the camera optical lens 10 is defined as f, and a focal length of the second lens L2 is defined as f2. The camera optical lens further satisfies the following condition: $0.50 \leq f2/f \leq 1.83$. It benefits for correcting the aberration of the camera optical lens by controlling the positive refractive power of the second lens L2 being within reasonable range. Preferably, the following condition shall be satisfied, $0.79 \leq f2/f \leq 1.46$.

A curvature radius of the object side surface of the second lens L2 is defined as R3, and a curvature radius of the image side surface of the second lens L2 is defined as R4. The camera optical lens further satisfies the following condition: $-2.43 \leq (R3+R4)/(R3-R4) \leq 0.76$, which defines a shape of the second lens L2. When the value is within the range, as the camera optical lens develops toward ultra-thin and wide-angle, it is beneficial to correct the problem of an axial chromatic aberration. Preferably, the following condition shall be satisfied, $-1.52 \leq (R3+R4)/(R3-R4) \leq 0.61$.

An on-axis thickness of the second lens L2 is defined as d3. The camera optical lens further satisfies the following condition: $0.05 \leq d3/TTL \leq 0.15$, which benefits for developing ultra-thin lenses. Preferably, the following condition shall be satisfied, $0.08 \leq d3/TTL \leq 0.12$.

In the embodiment, an object side surface of the third lens L3 is concave in the paraxial region, and the third lens L3 has a negative refractive power.

The focal length of the camera optical lens 10 is defined as f, and a focal length of the third lens L3 is defined as f3. The camera optical lens further satisfies the following condition: $f3/f \leq -0.89$. The appropriate distribution of the refractive power leads to a better imaging quality and a lower sensitivity. Preferably, the following condition shall be satisfied, $f3/f \leq -1.11$.

A curvature radius of the object side surface of the third lens L3 is defined as R5, and a curvature radius of an image side surface of the third lens L3 is defined as R6. The camera optical lens further satisfies the following condition: $-156.49 \leq (R5+R6)/(R5-R6) \leq 0.25$. This can effectively control a shape of the third lens L3, thereby facilitating shaping of the third lens L3 and avoiding bad shaping and generation of stress due to the overly large surface curvature of the third lens L3. Preferably, the following condition shall be satisfied, $-97.81 \leq (R5+R6)/(R5-R6) \leq 0.20$.

An on-axis thickness of the third lens L3 is defined as d5. The camera optical lens further satisfies the following condition: $0.02 \leq d5/TTL \leq 0.07$, which benefits for developing ultra-thin lenses. Preferably, the following condition shall be satisfied, $0.03 \leq d5/TTL \leq 0.06$.

In the embodiment, an object side surface of the fourth lens L4 is concave in the paraxial region, an image side surface of the fourth lens L4 is convex in the paraxial region, and the fourth lens L4 has a negative refractive power.

The focal length of the camera optical lens 10 is defined as f, and a focal length of the fourth lens L4 is defined as f4. The camera optical lens further satisfies the following condition: $f4/f \leq -3.39$. The appropriate distribution of the refractive power leads to the better imaging quality and the lower sensitivity. Preferably, the following condition shall be satisfied, $f4/f \leq -4.23$.

A curvature radius of the object side surface of the fourth lens L4 is defined as R7, and a curvature radius of the image side surface of the fourth lens L4 is defined as R8. The camera optical lens further satisfies the following condition: $-118.35 \leq (R7+R8)/(R7-R8) \leq -1.91$, which defines a shape of the fourth lens L4. When the value is within the range, as the development of ultra-thin and wide-angle lens, it benefits for solving the problems, such as correcting the off-axis aberration. Preferably, the following condition shall be satisfied, $-73.97 \leq (R7+R8)/(R7-R8) \leq -2.38$.

An on-axis thickness of the fourth lens L4 is defined as d7. The camera optical lens further satisfies the following condition: $0.03 \leq d7/TTL \leq 0.10$, which benefits for developing ultra-thin lenses. Preferably, the following condition shall be satisfied, $0.05 \leq d7/TTL \leq 0.08$.

In the embodiment, an object side surface of the fifth lens L5 is concave in the paraxial region, and the fifth lens L5 has a refractive power.

The focal length of the camera optical lens 10 is defined as f, and a focal length of the fifth lens L5 is defined as f5. The camera optical lens further satisfies the following condition: $-21.33 \leq f5/f \leq 3.67$, which can effectively make a light angle of the camera lens be gentle, and the sensitivity of the tolerance can be reduced. Preferably, the following condition shall be satisfied, −13.33≤f5/f≤2.93.

A curvature radius of the object side surface of the fifth lens L5 is defined as R9, and a curvature radius of an image side surface of the fifth lens L5 is defined as R10. The camera optical lens further satisfies the following condition: −18.44≤(R9+R10)/(R9−R10)≤2.66, which defines a shape of the fifth lens L5. When the value is within the range, as the development of ultra-thin and wide-angle lens, it benefits for solving the problems, such as correcting the off-axis aberration. Preferably, the following condition shall be satisfied, −11.52≤(R9+R10)/(R9−R10)≤2.13.

An on-axis thickness of the fifth lens L5 is defined as d9. The camera optical lens further satisfies the following condition: 0.03≤d9/TTL≤0.1, which benefits for developing ultra-thin lenses. Preferably, the following condition shall be satisfied, 0.05≤d9/TTL≤0.08.

In the embodiment, an object side surface of the sixth lens L6 is convex in the paraxial region, an image side surface of the sixth lens L6 is concave in the paraxial region, and the sixth lens L6 has a refractive power.

The focal length of the camera optical lens 10 is defined as f, and a focal length of the sixth lens L6 is defined as f6. The camera optical lens further satisfies the following condition: −9.60≤f6/f≤7.70. The appropriate distribution of the refractive power leads to the better imaging quality and the lower sensitivity. Preferably, the following condition shall be satisfied, −6.00≤f6/f≤6.16.

A curvature radius of the object side surface of the sixth lens L6 is defined as R11, and a curvature radius of the image side surface of the sixth lens L6 is defined as R12. The camera optical lens further satisfies the following condition: −25.72≤(R11+R12)/(R11−R12)≤15.10, which defines a shape of the sixth lens L6. When the value is within the range, as the development of ultra-thin and wide-angle lens, it benefits for solving the problems, such as correcting the off-axis aberration. Preferably, the following condition shall be satisfied, −16.07≤(R11+R12)/(R11−R12)≤12.08.

The on-axis thickness of the sixth lens L6 is defined as d11. The camera optical lens further satisfies the following condition: 0.03≤d11/TTL≤0.12, which benefits for developing ultra-thin lenses. Preferably, the following condition shall be satisfied, 0.05≤d11/TTL≤0.10.

In the embodiment, the object side surface of the seventh lens L7 is convex in the paraxial region, the image side surface of the seventh lens L7 is concave in the paraxial region, and the seventh lens L7 has negative refractive power.

The focal length of the camera optical lens 10 is defined as f, and a focal length of the seventh lens L7 is defined as f7. The camera optical lens further satisfies the following condition: −77.99≤f7/f≤−1.26. The appropriate distribution of the refractive power leads to the better imaging quality and the lower sensitivity. Preferably, the following condition shall be satisfied, −48.74≤≤f7/f≤−1.57.

An on-axis thickness of the seventh lens L7 is defined as d13. The camera optical lens further satisfies the following condition: 0.07≤d13/TTL≤0.26, which benefits for developing ultra-thin lenses. Preferably, the following condition shall be satisfied, 0.12≤d13/TTL≤0.21.

In this embodiment, the total optical length TTL of the camera optical lens 10 is less than or equal to 5.79 mm, it benefits for developing ultra-thin lenses. Preferably, the total optical length TTL of the camera optical lens 10 is less than or equal to 5.52 mm.

In this embodiment, an F number of the camera optical lens 10 is less than or equal to 1.65. The camera optical lens 10 has a large F number and a better imaging performance. Preferably, the F number of the camera optical lens 10 is less than or equal to 1.62.

With such design, the total optical length TTL of the camera optical lens 10 can be made as short as possible, thus the miniaturization characteristics can be maintained.

In the following, examples will be used to describe the camera optical lens 10 of the present invention. The symbols recorded in each example will be described as follows. The focal length, on-axis distance, curvature radius, on-axis thickness, inflexion point position, and arrest point position are all in units of mm.

TTL: the total optical length from the object side surface of the first lens to the image surface Si of the camera optical lens 10 along the optical axis, the unit of TTL is mm.

Preferably, inflexion points and/or arrest points can also be arranged on the object side surface and/or image side surface of the lens, so that the demand for high quality imaging can be satisfied, the description below can be referred for specific implementable scheme.

The design information of the camera optical lens 10 in Embodiment 1 of the present invention is shown in the tables 1 and 2.

TABLE 1

| | R | d | | nd | | vd |
|---|---|---|---|---|---|---|
| S1 | ∞ | d0 = | −0.288 | | | |
| R1 | 2.479 | d1 = | 0.373 | nd1 | 1.5473 v1 | 55.81 |
| R2 | 5.661 | d2 = | 0.211 | | | |
| R3 | 3.765 | d3 = | 0.540 | nd2 | 1.5473 v2 | 55.81 |
| R4 | −8.338 | d4 = | 0.070 | | | |
| R5 | −11.723 | d5 = | 0.254 | nd3 | 1.6464 v3 | 23.54 |
| R6 | 8.388 | d6 = | 0.281 | | | |
| R7 | −5.735 | d7 = | 0.302 | nd4 | 1.5473 v4 | 55.81 |
| R8 | −11.905 | d8 = | 0.151 | | | |
| R9 | −20.877 | d9 = | 0.325 | nd5 | 1.8099 v5 | 40.89 |
| R10 | −5.836 | d10 = | 0.315 | | | |
| R11 | 1.964 | d11 = | 0.345 | nd6 | 1.8099 v6 | 40.89 |
| R12 | 1.609 | d12 = | 0.416 | | | |
| R13 | 2.653 | d13 = | 0.766 | nd7 | 1.5473 v7 | 55.81 |
| R14 | 1.856 | d14 = | 0.409 | | | |
| R15 | ∞ | d15 = | 0.210 | ndg | 1.5168 vg | 64.17 |
| R16 | ∞ | d16 = | 0.293 | | | | where, the meaning of the various symbols is as follows.

S1: aperture;

R: curvature radius of an optical surface, a central curvature radius for a lens;

R1: curvature radius of the object side surface of the first lens L1;

R2: curvature radius of the image side surface of the first lens L1;

R3: curvature radius of the object side surface of the second lens L2;

R4: curvature radius of the image side surface of the second lens L2;

R5: curvature radius of the object side surface of the third lens L3;

R6: curvature radius of the image side surface of the third lens L3;

R7: curvature radius of the object side surface of the fourth lens L4;

R8: curvature radius of the image side surface of the fourth lens L4;

R9: curvature radius of the object side surface of the fifth lens L5;

R10: curvature radius of the image side surface of the fifth lens L5;

R11: curvature radius of the object side surface of the sixth lens L6;
R12: curvature radius of the image side surface of the sixth lens L6;
R13: curvature radius of an object side surface of the optical filter GF;
R14: curvature radius of an image side surface of the optical filter GF;
d: on-axis thickness of a lens and an on-axis distance between lenses;
d0: on-axis distance from the aperture S1 to the object side surface of the first lens L1;
d1: on-axis thickness of the first lens L1;
d2: on-axis distance from the image side surface of the first lens L1 to the object side surface of the second lens L2;
d3: on-axis thickness of the second lens L2;
d4: on-axis distance from the image side surface of the second lens L2 to the object side surface of the third lens L3;
d5: on-axis thickness of the third lens L3;
d6: on-axis distance from the image side surface of the third lens L3 to the object side surface of the fourth lens L4;
d7: on-axis thickness of the fourth lens L4;
d8: on-axis distance from the image side surface of the fourth lens L4 to the object side surface of the fifth lens L5;
d9: on-axis thickness of the fifth lens L5;
d10: on-axis distance from the image side surface of the fifth lens L5 to the object side surface of the sixth lens L6;
d11: on-axis thickness of the sixth lens L6;
d12: on-axis distance from the image side surface of the sixth lens L6 to the object side surface of the optical filter GF;
d13: on-axis thickness of the optical filter GF;
d14: on-axis distance from the image side surface of the optical filter GF to the image surface;
nd: refractive index of d line;
nd1: refractive index of d line of the first lens L1;
nd2: refractive index of d line of the second lens L2;
nd3: refractive index of d line of the third lens L3;
nd4: refractive index of d line of the fourth lens L4;
nd5: refractive index of d line of the fifth lens L5;
nd6: refractive index of d line of the sixth lens L6;
ndg: refractive index of d line of the optical filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6;
vg: abbe number of the optical filter GF;

Table 2 shows the aspherical surface data of the camera optical lens 10 in Embodiment 1 of the present invention.

TABLE 2

| | Conic coefficient | Aspheric surface coefficients | | | |
|---|---|---|---|---|---|
| | k | A4 | A6 | A8 | A10 |
| R1 | −2.2455E−02 | −3.0958E−02 | 5.3768E−02 | −1.2369E−01 | 1.4221E−01 |
| R2 | 1.6614E+01 | −3.3645E−02 | −6.3374E−03 | 2.3597E−02 | 5.8765E−03 |
| R3 | 5.7576E+00 | −6.1955E−02 | 3.6524E−02 | 2.5479E−02 | −5.2451E−02 |
| R4 | −3.2291E+02 | −5.2329E−02 | 9.0804E−02 | −1.6459E−01 | 1.1943E−01 |
| R5 | −9.5699E+02 | 9.0475E−02 | 2.6196E−02 | −3.0807E−01 | 3.0735E−01 |
| R6 | 3.7277E+01 | 1.3324E−01 | 4.0831E−02 | −3.9838E−01 | 5.1390E−01 |
| R7 | 1.7615E+01 | 4.0543E−02 | 3.2173E−02 | 1.7030E−05 | 2.1882E−04 |
| R8 | 2.0849E+01 | −4.6518E−02 | 8.7305E−02 | −8.4304E−02 | 2.4163E−02 |
| R9 | 1.0079E+02 | 5.1753E−02 | −2.6166E−02 | −7.8841E−02 | 1.2717E−01 |
| R10 | 6.2280E+00 | 4.3354E−02 | −8.3161E−02 | 7.1688E−02 | −3.6176E−02 |
| R11 | −1.4067E+01 | 2.4182E−02 | −9.3054E−02 | 5.8966E−02 | −3.0848E−02 |
| R12 | −1.1899E+01 | 5.8083E−03 | −3.6401E−02 | 9.5319E−03 | −8.9946E−04 |
| R13 | −1.8550E+01 | −1.9041E−01 | 7.4203E−02 | −1.4971E−02 | 1.4513E−03 |
| R14 | −6.2576E−01 | −2.0374E−01 | 8.2538E−02 | −2.7387E−02 | 6.0489E−03 |

| | Conic coefficient | Aspheric surface coefficients | | | |
|---|---|---|---|---|---|
| | k | A12 | A14 | A16 | A18 | A20 |
| R1 | −2.2455E−02 | −7.3618E−02 | 1.3380E−02 | 2.1695E−04 | 1.2850E−03 | −7.1702E−04 |
| R2 | 1.6614E+01 | −4.4044E−03 | −2.9421E−03 | 4.1478E−02 | −9.0115E−05 | −1.0496E−04 |
| R3 | 5.7576E+00 | 4.5841E−02 | −9.8806E−03 | −2.9060E−02 | 2.2118E−02 | −4.4610E−03 |
| R4 | −3.2291E+02 | −4.5581E−02 | 1.3636E−02 | −3.2205E−03 | −2.1385E−03 | 1.7732E−03 |
| R5 | −9.5699E+02 | −1.6492E−01 | 1.0222E−01 | −5.6675E−02 | 1.9757E−02 | −3.2658E−03 |
| R6 | 3.7277E+01 | −3.4712E−01 | 1.4170E−01 | −3.5180E−02 | 1.1989E−03 | 4.1063E−03 |
| R7 | 1.7615E+01 | −2.5511E−02 | 3.8891E−03 | 1.8308E−03 | 3.0963E−03 | 2.8474E−04 |
| R8 | 2.0849E+01 | 1.5691E−02 | −1.6401E−02 | 2.7704E−03 | −2.8555E−04 | 5.2676E−04 |
| R9 | 1.0079E+02 | −6.9535E−02 | 7.7982E−03 | 2.1614E−03 | 1.9783E−03 | −1.0429E−03 |
| R10 | 6.2280E+00 | 1.2766E−02 | −1.7083E−03 | −1.2854E−04 | −1.4242E−04 | 5.1996E−05 |
| R11 | −1.4067E+01 | 7.2934E−03 | −1.3001E−03 | −1.2771E−05 | −4.0912E−05 | 4.3661E−06 |
| R12 | −1.1899E+01 | −1.1721E−05 | −1.2580E−06 | 1.4175E−06 | 2.2490E−07 | −3.6199E−08 |
| R13 | −1.8550E+01 | −2.5854E−05 | −2.5091E−06 | 2.6715E−07 | −1.0597E−08 | −1.0497E−08 |
| R14 | −6.2576E−01 | −8.3190E−04 | 6.5833E−05 | −2.7590E−06 | 7.3989E−08 | −2.6360E−09 |

Where, K is a conic coefficient, A4, A6, A8, A10, A12, A14, A16, A18, A20 are aspheric surface coefficients.
IH: Image height $$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16}+A18x^{18}+A20x^{20} \quad (1)$$

For convenience, an aspheric surface of each lens surface uses the aspheric surfaces shown in the above condition (1). However, the present invention is not limited to the aspherical polynomials form shown in the condition (1).

Table 3 and Table 4 show design data of inflexion points and arrest points of respective lens in the camera optical lens 10 according to Embodiment 1 of the present invention. P1R1 and P1R2 represent the object side surface and the image side surface of the first lens L1, P2R1 and P2R2 represent the object side surface and the image side surface of the second lens L2, P3R1 and P3R2 represent the object side surface and the image side surface of the third lens L3, P4R1 and P4R2 represent the object side surface and the image side surface of the fourth lens L4, P5R1 and P5R2 represent the object side surface and the image side surface of the fifth lens L5, and P6R1 and P6R2 represent the object side surface and the image side surface of the sixth lens L6. The data in the column named "inflexion point position" refers to vertical distances from inflexion points arranged on each lens surface to the optical axis of the camera optical lens 10. The data in the column named "arrest point position" refers to vertical distances from arrest points arranged on each lens surface to the optical axis of the camera optical lens 10.

TABLE 3

| | Number of inflexion points | Inflexion point position 1 | Inflexion point position 2 | Inflexion point position 3 |
|---|---|---|---|---|
| P1R1 | 1 | 1.205 | | |
| P1R2 | 1 | 1.145 | | |
| P2R1 | 1 | 1.025 | | |
| P2R2 | 1 | 1.105 | | |
| P3R1 | 3 | 0.225 | 0.635 | 0.975 |
| P3R2 | 0 | | | |
| P4R1 | 3 | 0.555 | 0.875 | 1.055 |
| P4R2 | 0 | | | |
| P5R1 | 2 | 0.315 | 0.615 | |
| P5R2 | 2 | 1.095 | 1.385 | |
| P6R1 | 2 | 0.615 | 1.585 | |
| P6R2 | 2 | 0.665 | 1.985 | |
| P7R1 | 2 | 0.355 | 1.725 | |
| P7R2 | 1 | 0.565 | | |

TABLE 4

| | Number of arrest points | Arrest point position 1 | Arrest point position 2 | Arrest point position 3 |
|---|---|---|---|---|
| P1R1 | 0 | | | |
| P1R2 | 0 | | | |
| P2R1 | 0 | | | |
| P2R2 | 0 | | | |
| P3R1 | 3 | 0.415 | 0.765 | 1.075 |
| P3R2 | 0 | | | |
| P4R1 | 0 | | | |
| P4R2 | 0 | | | |
| P5R1 | 0 | | | |
| P5R2 | 0 | | | |
| P6R1 | 1 | 1.025 | | |
| P6R2 | 1 | 1.205 | | |
| P7R1 | 1 | 0.665 | | |
| P7R2 | 1 | 1.185 | | |

Figure 2:
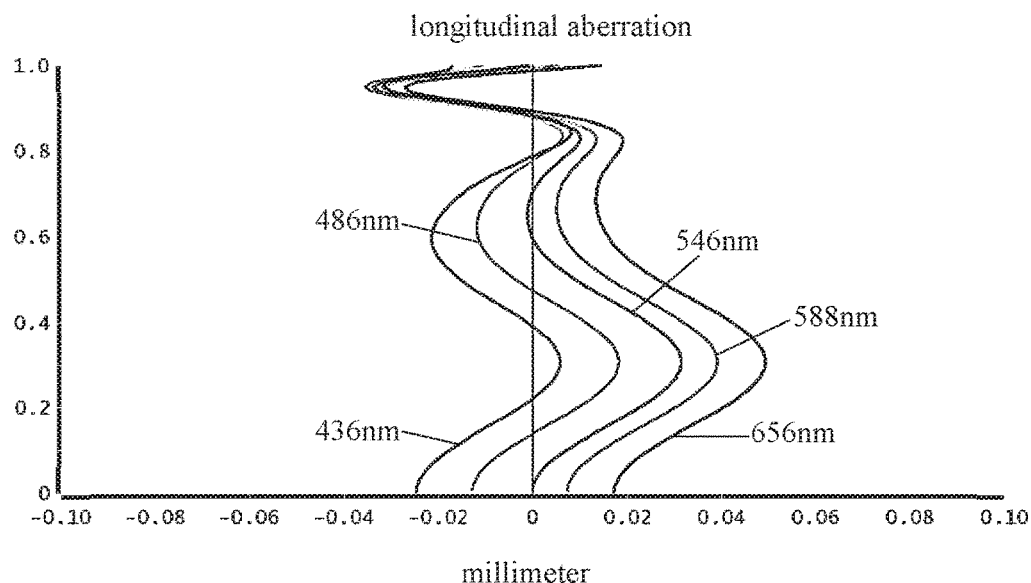
FIG. 2 is a schematic diagram of a longitudinal aberration of the camera optical lens shown in FIG. 1.
Figure 3:
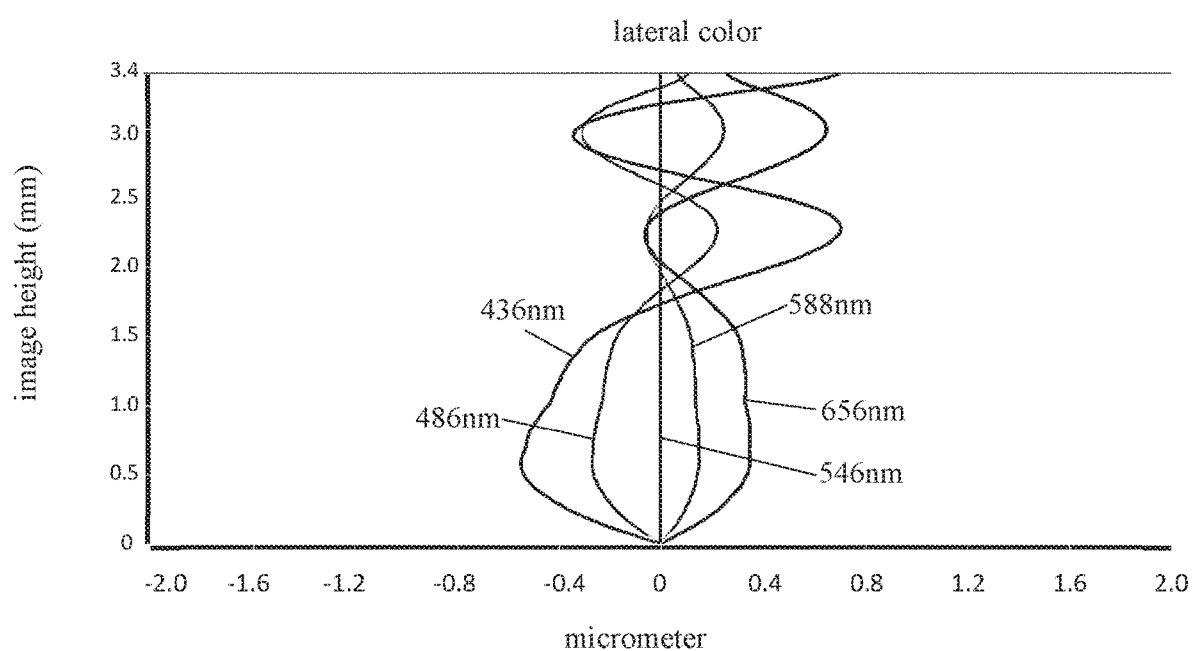
FIG. 3 is a schematic diagram of a lateral color of the camera optical lens shown in FIG. 1.
Figure 4:
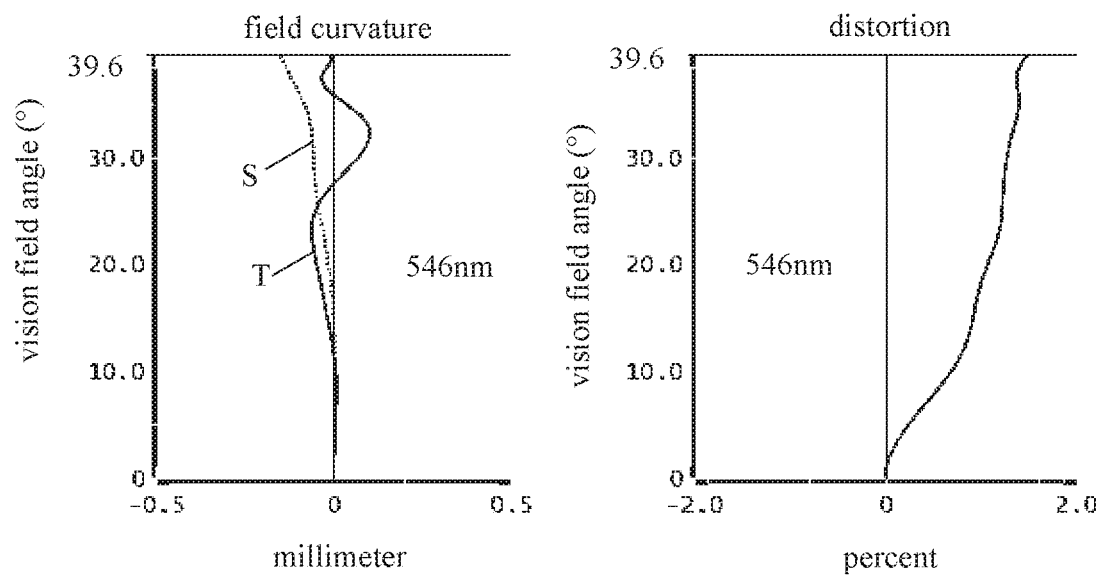
FIG. 4 is a schematic diagram of a field curvature and a distortion of the camera optical lens shown in FIG. 1.
Figure 5:
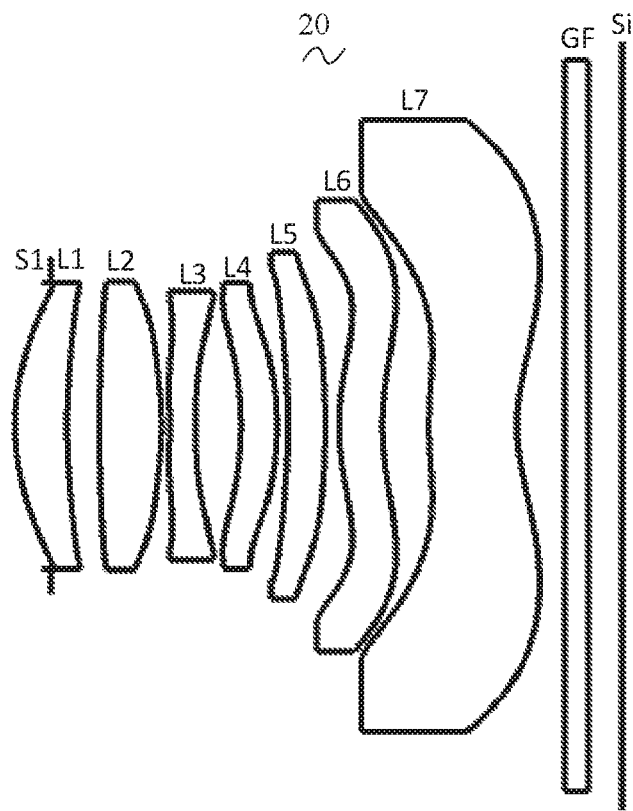
FIG. 5 is a schematic diagram of a structure of a camera optical lens in accordance with Embodiment 2 of the present invention.

FIG. 2 and FIG. 3 respectively illustrate a longitudinal aberration and a lateral color of light with wavelengths of 436 nm, 486 nm, 546 nm, 588 nm and 656 nm after passing the camera optical lens 10 according to Embodiment 1. FIG. 4 illustrates a field curvature and a distortion of light with a wavelength of 546 nm after passing the camera optical lens 10 according to Embodiment 1, in which a field curvature S is a field curvature in a sagittal direction and T is a field curvature in a tangential direction.

Table 13 shows various values of Embodiments 1, 2 and 3 and values corresponding to parameters which are specified in the above conditions.

As shown in Table 13, Embodiment satisfies the above conditions.

In this embodiment, the entrance pupil diameter of the camera optical lens 10 is 2.532 mm. The image height of 1.0H is 3.400 mm. The FOV is 79.20°. Thus, the camera optical lens has a wide-angle and is ultra-thin. Its on-axis and off-axis chromatic aberrations are fully corrected, thereby achieving excellent optical characteristics.

Embodiment 2

Embodiment 2 is basically the same as Embodiment 1, the meaning of its symbols is the same as that of Embodiment 1, in the following, only the differences are listed.

Table 5 and table 6 show the design data of a camera optical lens 20 in Embodiment 2 of the present invention.

TABLE 5

| | R | d | | nd | | vd |
|---|---|---|---|---|---|---|
| S1 | ∞ | d0 = | −0.311 | | | |
| R1 | 2.124 | d1 = | 0.450 | nd1 | 1.5473 | v1 55.81 |
| R2 | 5.339 | d2 = | 0.280 | | | |
| R3 | 8.787 | d3 = | 0.540 | nd2 | 1.5473 | v2 55.81 |
| R4 | −2.873 | d4 = | 0.069 | | | |
| R5 | −7.343 | d5 = | 0.225 | nd3 | 1.6464 | v3 23.54 |
| R6 | 6.700 | d6 = | 0.393 | | | |
| R7 | −3.290 | d7 = | 0.310 | nd4 | 1.5473 | v4 55.81 |
| R8 | −3.494 | d8 = | 0.099 | | | |
| R9 | −5.408 | d9 = | 0.323 | nd5 | 1.7114 | v5 30.23 |
| R10 | −6.724 | d10 = | 0.118 | | | |
| R11 | 2.117 | d11 = | 0.377 | nd6 | 1.7114 | v6 30.23 |
| R12 | 2.474 | d12 = | 0.404 | | | |
| R13 | 3.370 | d13 = | 0.761 | nd7 | 1.5473 | v7 55.81 |
| R14 | 1.718 | d14 = | 0.409 | | | |
| R15 | ∞ | d15 = | 0.210 | ndg | 1.5168 | vg 64.17 |
| R16 | ∞ | d16 = | 0.293 | | | |

Table 6 shows aspherical surface data of each lens of the camera optical lens 20 in Embodiment 2 of the present invention.

TABLE 6

| | Conic coefficient | Aspherical surface coefficients | | | |
|---|---|---|---|---|---|
| | k | A4 | A6 | A8 | A10 |
| R1 | −5.3913E−02 | −4.8109E−02 | 7.9839E−02 | −1.3347E−01 | 1.3297E−01 |
| R2 | 4.5045E+00 | −5.8914E−02 | 3.8093E−02 | 8.5366E−04 | −8.4720E−03 |
| R3 | 4.1347E+01 | −9.1566E−02 | 9.0430E−02 | −1.2716E−02 | −5.7694E−02 |
| R4 | −4.2767E+01 | 5.0933E−03 | 4.0267E−02 | −1.6228E−01 | 1.2928E−01 |

TABLE 6-continued

| | | | | | |
|---|---|---|---|---|---|
| R5 | −6.6540E+02 | 2.3142E−01 | −1.0695E−01 | −2.9127E−01 | 3.1825E−01 |
| R6 | 1.6388E+01 | 1.5391E−01 | −1.1171E−03 | −3.9155E−01 | 5.1219E−01 |
| R7 | 5.8205E+00 | −3.5574E−02 | 5.7856E−02 | 2.5136E−02 | 9.8196E−03 |
| R8 | 4.7482E+00 | −1.2190E−01 | 1.2659E−01 | −5.5393E−02 | 2.7135E−02 |
| R9 | 3.5808E+00 | 6.5534E−02 | −2.2072E−02 | −8.2328E−02 | 1.2888E−01 |
| R10 | 9.7839E+00 | 3.0554E−02 | −8.2083E−02 | 7.1976E−02 | −3.8721E−02 |
| R11 | −1.3317E+01 | 9.5283E−03 | −9.1212E−02 | 6.0357E−02 | −3.0279E−02 |
| R12 | −1.7146E+01 | −5.3738E−05 | −3.4093E−02 | 9.7445E−03 | −9.0103E−04 |
| R13 | −1.4624E+01 | −1.8751E−01 | 7.2535E−02 | −1.5415E−02 | 1.4029E−03 |
| R14 | −6.7214E−01 | −1.9495E−01 | 8.1151E−02 | −2.7396E−02 | 6.0465E−03 |

| | Conic coefficients | Aspherical surface | | | |
|---|---|---|---|---|---|
| | k | A12 | A14 | A16 | A18 | A20 |
| R1 | −5.3913E−02 | −7.4605E−02 | 1.4160E−02 | 1.4039E−03 | 1.8145E−03 | −1.0472E−03 |
| R2 | 4.5045E+00 | −4.6106E−03 | 7.9342E−04 | 3.2514E−03 | 6.1453E−04 | −8.4337E−04 |
| R3 | 4.1347E+01 | 5.3236E−02 | −5.0789E−03 | −2.8685E−02 | 2.1359E−02 | −4.6786E−03 |
| R4 | −4.2767E+01 | −4.3923E−02 | 1.0557E−02 | −2.8421E−03 | −1.2465E−03 | 9.4327E−04 |
| R5 | −6.6540E+02 | −1.6339E−01 | 1.0078E−01 | −5.9039E−02 | 1.9210E−02 | −2.6108E−03 |
| R6 | 1.6388E+01 | −3.4721E−01 | 1.4490E−01 | −2.9113E−02 | 1.0401E−03 | −1.9149E−04 |
| R7 | 5.8205E+00 | −2.1951E−01 | 3.2873E−03 | 2.3996E−03 | 3.6398E−03 | −1.9392E−03 |
| R8 | 4.7482E+00 | 1.3088E−02 | −1.7201E−02 | 5.3500E−03 | 2.0036E−04 | −5.1673E−04 |
| R9 | 3.5808E+00 | −6.9022E−02 | 7.4283E−03 | 2.0514E−03 | 1.9648E−03 | −8.9882E−04 |
| R10 | 9.7839E+00 | 1.1660E−02 | −1.6453E−03 | 2.0481E−04 | 7.4580E−06 | −1.7478E−05 |
| R11 | −1.3317E+01 | 7.3823E−03 | −1.5423E−04 | −2.9456E−05 | −4.4238E−05 | 5.3842E−06 |
| R12 | −1.7146E+01 | −3.0883E−06 | −2.5870E−06 | 2.6536E−07 | −5.9262E−08 | 5.1222E−08 |
| R13 | −1.4624E+01 | −2.3670E−05 | 2.8378E−07 | 1.1906E−06 | 9.6995E−08 | −4.6832E−08 |
| R14 | −6.7214E−01 | −8.3151E−04 | 6.5870E−05 | −2.7593E−06 | 7.3531E−08 | −2.5936E−09 |

Table 7 and table 8 show design data of inflexion points and arrest points of respective lens in the camera optical lens 20 according to Embodiment 2 of the present invention.

TABLE 7

| | Number of inflexion points | Inflexion point position 1 | Inflexion point position 2 | Inflexion point position 3 |
|---|---|---|---|---|
| P1R1 | 1 | 1.225 | | |
| P1R2 | 0 | | | |
| P2R1 | 0 | | | |
| P2R2 | 1 | 1.185 | | |
| P3R1 | 3 | 0.185 | 0.675 | 1.075 |
| P3R2 | 2 | 0.795 | 0.985 | |
| P4R1 | 1 | 0.785 | | |
| P4R2 | 2 | 0.875 | 1.225 | |
| P5R1 | 0 | | | |
| P5R2 | 2 | 1.325 | 1.525 | |
| P6R1 | 3 | 0.585 | 1.525 | 1.705 |
| P6R2 | 2 | 0.645 | 1.975 | |
| P7R1 | 2 | 0.355 | 1.835 | |
| P7R2 | 1 | 0.625 | | |

TABLE 8

| | Number of arrest points | Arrest point position 1 | Arrest point position 2 |
|---|---|---|---|
| P1R1 | 0 | | |
| P1R2 | 0 | | |
| P2R1 | 0 | | |
| P2R2 | 0 | | |
| P3R1 | 2 | 0.325 | 0.875 |
| P3R2 | 0 | | |
| P4R1 | 1 | 1.125 | |
| P4R2 | 0 | | |
| P5R1 | 0 | | |
| P5R2 | 0 | | |
| P6R1 | 1 | 1.005 | |
| P6R2 | 1 | 1.125 | |
| P7R1 | 1 | 0.645 | |
| P7R2 | 1 | 1.405 | |

Figure 6:
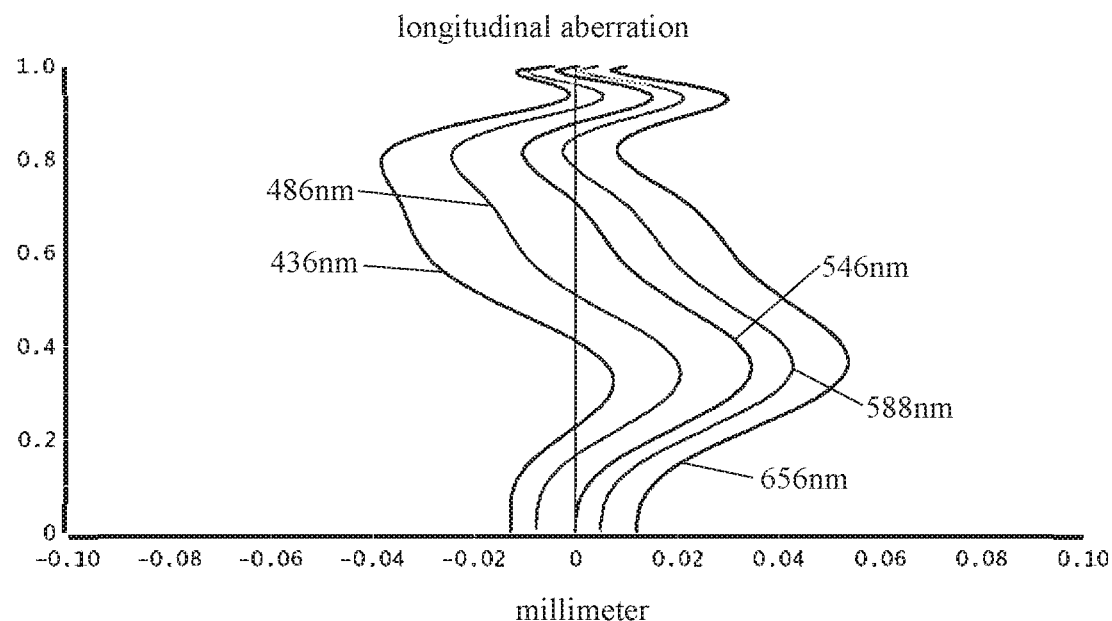
FIG. 6 is a schematic diagram of a longitudinal aberration of the camera optical lens shown in FIG. 5.
Figure 7:
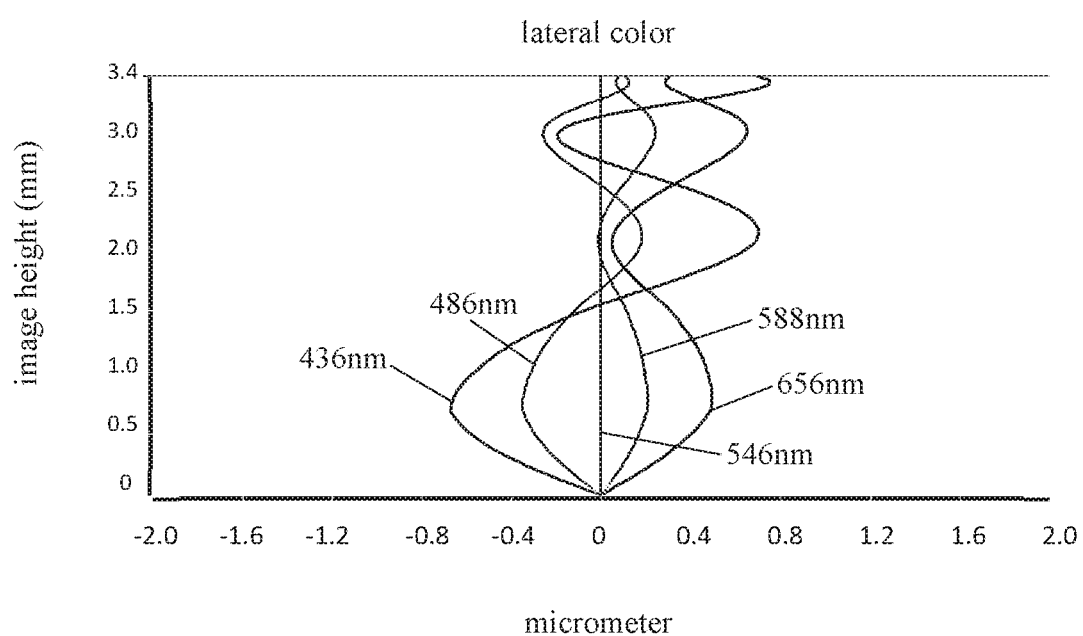
FIG. 7 is a schematic diagram of a lateral color of the camera optical lens shown in FIG. 5.
Figure 8:
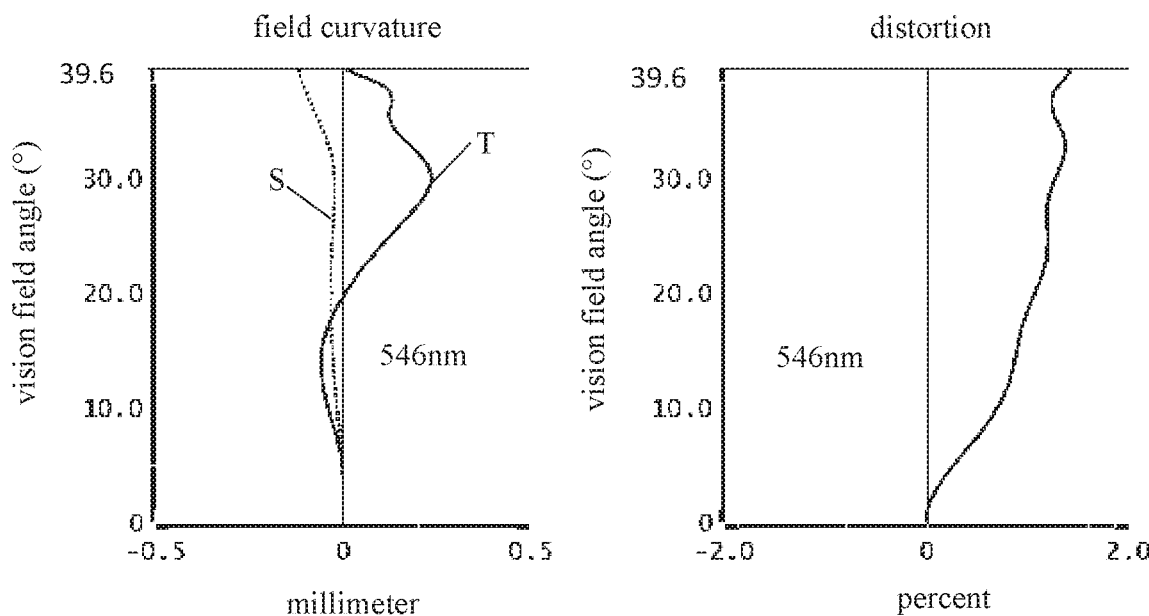
FIG. 8 is a schematic diagram of a field curvature and a distortion of the camera optical lens shown in FIG. 5.
Figure 9:
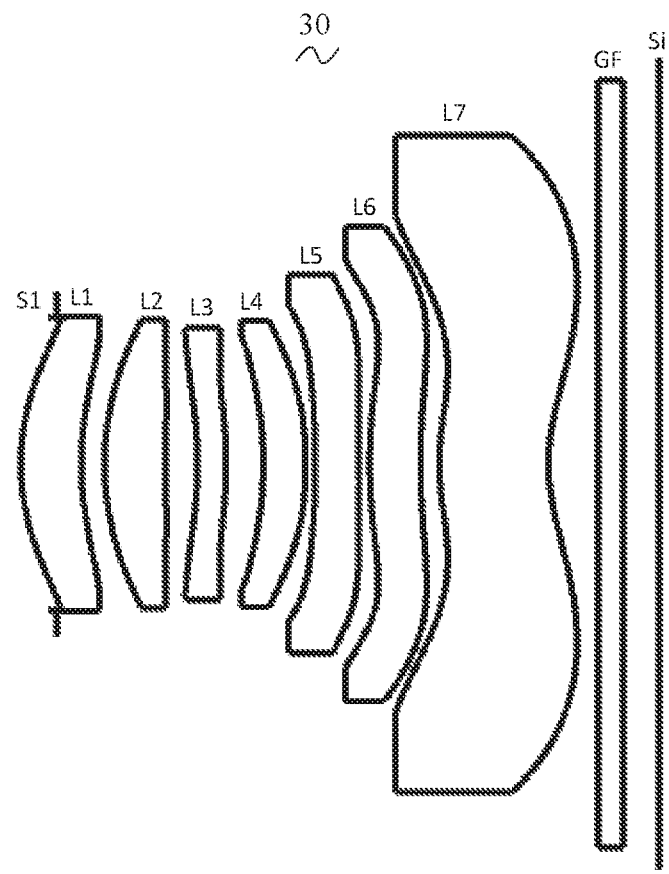
FIG. 9 is a schematic diagram of a structure of a camera optical lens in accordance with Embodiment 3 of the present invention.

FIG. 6 and FIG. 7 respectively illustrate a longitudinal aberration and a lateral color of light with wavelengths of 436 nm, 486 nm, 546 nm, 588 nm and 656 nm after passing the camera optical lens 20 according to Embodiment 2. FIG. 8 illustrates a field curvature and a distortion of light with a wavelength of 546 nm after passing the camera optical lens 10 according to Embodiment 2, in which a field curvature S is a field curvature in a sagittal direction and T is a field curvature in a tangential direction.

As shown in Table 13, Embodiment 2 satisfies the various conditions.

In this embodiment, the entrance pupil diameter of the camera optical lens is 2.536 mm. The image height of 1.0H is 3.400 mm. The FOV is 79.20°. Thus, the camera optical lens has a wide-angle and is ultra-thin. Its on-axis and off-axis chromatic aberrations are fully corrected, thereby achieving excellent optical characteristics.

Embodiment 3

Embodiment 3 is basically the same as Embodiment 1 and involves symbols having the same meanings as Embodiment 1, and only differences therebetween will be described in the following.

Tables 9 and 10 show design data of a camera optical lens 30 in Embodiment 3 of the present invention.

TABLE 9

| | R | d | | nd | | vd |
|---|---|---|---|---|---|---|
| S1 | ∞ | d0 = | −0.298 | | | |
| R1 | 1.951 | d1 = | 0.499 | nd1 | 1.5473 | v1 | 55.81 |
| R2 | 2.779 | d2 = | 0.192 | | | |
| R3 | 2.407 | d3 = | 0.507 | nd2 | 1.5473 | v2 | 55.81 |
| R4 | 24.780 | d4 = | 0.259 | | | |
| R5 | −3.592 | d5 = | 0.236 | nd3 | 1.6464 | v3 | 23.54 |
| R6 | −3.685 | d6 = | 0.306 | | | |
| R7 | −3.665 | d7 = | 0.351 | nd4 | 1.5473 | v4 | 55.81 |
| R8 | −3.791 | d8 = | 0.077 | | | |
| R9 | −9.681 | d9 = | 0.358 | nd5 | 2.1171 | v5 | 18.05 |
| R10 | 22.045 | d10 = | 0.091 | | | |
| R11 | 4.661 | d11 = | 0.418 | nd6 | 2.1171 | v6 | 18.05 |
| R12 | 5.588 | d12 = | 0.156 | | | |
| R13 | 1.941 | d13 = | 0.899 | nd7 | 1.5473 | v7 | 55.81 |
| R14 | 1.587 | d14 = | 0.409 | | | |
| R15 | ∞ | d15 = | 0.210 | ndg | 1.5168 | vg | 64.17 |
| R16 | ∞ | d16 = | 0.293 | | | |

Table 10 shows aspherical surface data of each lens of the camera optical lens 30 in Embodiment 3 of the present invention.

TABLE 10

| | Conic coefficient | Aspherical surface coefficients | | | |
|---|---|---|---|---|---|
| | k | A4 | A6 | A8 | A10 |
| R1 | −9.0244E−03 | −3.9770E−02 | 5.9960E−02 | −1.3026E−01 | 1.3138E−01 |
| R2 | 3.2364E+00 | −4.7039E−02 | −3.0114E−02 | 4.9000E−03 | 3.3967E−03 |
| R3 | 1.8612E+00 | −1.9929E−02 | −5.4069E−02 | 7.0599E−02 | −5.5489E−02 |
| R4 | 2.6933E+02 | −7.3989E−02 | 1.2444E−01 | −1.6470E−01 | 1.4709E−01 |
| R5 | 7.0930E+00 | −1.1896E−02 | 2.7088E−01 | −3.4153E−01 | 2.6195E−01 |
| R6 | 5.3692E+00 | 5.9270E−02 | 1.6266E−01 | −2.0328E−01 | 2.8427E−01 |
| R7 | 2.4368E+00 | −7.2543E−02 | 1.0693E−01 | −2.2472E−02 | 2.8399E−02 |
| R8 | 6.0157E+00 | −2.2718E−01 | 3.5400E−01 | −3.2330E−01 | 2.3212E−01 |
| R9 | 4.0387E+01 | −3.1222E−02 | 5.0506E−02 | −8.5643E−02 | 1.0564E−01 |
| R10 | 1.4196E+02 | −8.2822E−03 | −5.9418E−02 | 5.8786E−02 | −3.7050E−02 |
| R11 | −3.4133E+01 | 5.4089E−02 | −1.0904E−01 | 6.4807E−02 | −3.0078E−02 |
| R12 | −7.0766E+01 | 1.8728E−02 | −3.9103E−02 | 9.1566E−03 | −1.0204E−04 |
| R13 | −9.7955E+00 | −1.7996E−01 | 6.6871E−02 | −1.4147E−02 | 1.6086E−03 |
| R14 | −7.1667E−01 | −1.9995E−01 | 8.1733E−02 | −2.7380E−02 | 6.0607E−03 |

| | Conic coefficient | Aspherical surface coefficients | | | |
|---|---|---|---|---|---|
| | k | A12 | A14 | A16 | A18 | A20 |
| R1 | −9.0244E−03 | −7.1372E−02 | 1.4952E−02 | −7.4337E−05 | 6.8331E−04 | −3.8229E−04 |
| R2 | 3.2364E+00 | −6.2101E−03 | −3.4913E−03 | 2.6873E−03 | 8.0591E−04 | −7.0836E−04 |
| R3 | 1.8612E+00 | 3.9290E−02 | −5.6925E−03 | −2.7028E−02 | 2.1558E−02 | −5.3021E−03 |
| R4 | 2.6933E+02 | −6.1472E−02 | 3.3051E−03 | −3.0407E−04 | 2.8933E−03 | −5.9292E−04 |
| R5 | 7.0930E+00 | −1.7897E−01 | 1.1699E−01 | −5.2244E−02 | 1.3843E−02 | −7.6750E−04 |
| R6 | 5.3692E+00 | −3.8333E−01 | 2.2495E−01 | −6.9603E−03 | −3.8348E−02 | 1.0113E−02 |
| R7 | 2.4368E+00 | −4.0066E−02 | −3.7195E−02 | 1.3180E−02 | 4.3221E−02 | −2.3509E−02 |
| R8 | 6.0157E+00 | −7.5570E−02 | −5.0844E−02 | 4.4667E−02 | −2.8662E−03 | −2.8023E−03 |
| R9 | 4.0387E+01 | −8.0782E−02 | 1.9349E−02 | 8.2001E−03 | −4.9274E−03 | 7.0283E−04 |
| R10 | 1.4196E+02 | 1.2692E−02 | −2.3286E−03 | −8.0864E−05 | 2.5643E−04 | −5.3176E−05 |
| R11 | −3.4133E+01 | 7.2217E−03 | −1.7750E−04 | −3.6354E−05 | −4.8923E−05 | 7.4855E−06 |
| R12 | −7.0766E+01 | −1.9464E−04 | 2.7582E−05 | −4.0590E−06 | 4.7595E−07 | −1.7863E−08 |
| R13 | −9.7955E+00 | −2.6895E−05 | −6.0065E−06 | −7.3994E−07 | −9.8518E−09 | 2.0027E−08 |
| R14 | −7.1667E−01 | −8.3715E−04 | 6.6170E−05 | −2.6591E−06 | 5.7790E−08 | −2.0093E−09 |

Table 11 and table 12 show Embodiment 3 design data of inflexion points and arrest points of respective lens in the camera optical lens 30 according to Embodiment 3 of the present invention.

TABLE 11

| | Number of inflexion points | Inflexion point position 1 | Inflexion point position 2 | Inflexion point position 3 |
|---|---|---|---|---|
| P1R1 | 1 | 1.005 | | |
| P1R2 | 1 | 0.795 | | |
| P2R1 | 1 | 1.095 | | |
| P2R2 | 3 | 0.255 | 0.765 | 1.145 |
| P3R1 | 1 | 0.615 | | |
| P3R2 | 2 | 0.485 | 0.945 | |
| P4R1 | 0 | | | |
| P4R2 | 1 | 1.125 | | |
| P5R1 | 1 | 1.325 | | |
| P5R2 | 2 | 0.405 | 1.455 | |
| P6R1 | 3 | 0.645 | 1.575 | 1.655 |
| P6R2 | 1 | 0.645 | | |

TABLE 11-continued

| | Number of inflexion points | Inflexion point position 1 | Inflexion point position 2 | Inflexion point position 3 |
|---|---|---|---|---|
| P7R1 | 2 | 0.415 | 1.725 | |
| P7R2 | 1 | 0.655 | | |

TABLE 12

| | Number of arrest points | Arrest point position 1 | Arrest point position 2 | Arrest point position 3 |
|---|---|---|---|---|
| P1R1 | 0 | | | |
| P1R2 | 1 | 1.165 | | |
| P2R1 | 0 | | | |
| P2R2 | 3 | 0.495 | 0.955 | 1.165 |
| P3R1 | 1 | 1.105 | | |
| P3R2 | 2 | 0.855 | 1.045 | |
| P4R1 | 0 | | | |
| P4R2 | 0 | | | |
| P5R1 | 0 | | | |
| P5R2 | 1 | 0.635 | | |
| P6R1 | 1 | 0.995 | | |
| P6R2 | 1 | 1.025 | | |
| P7R1 | 1 | 0.805 | | |
| P7R2 | 1 | 1.495 | | |

Figure 10:
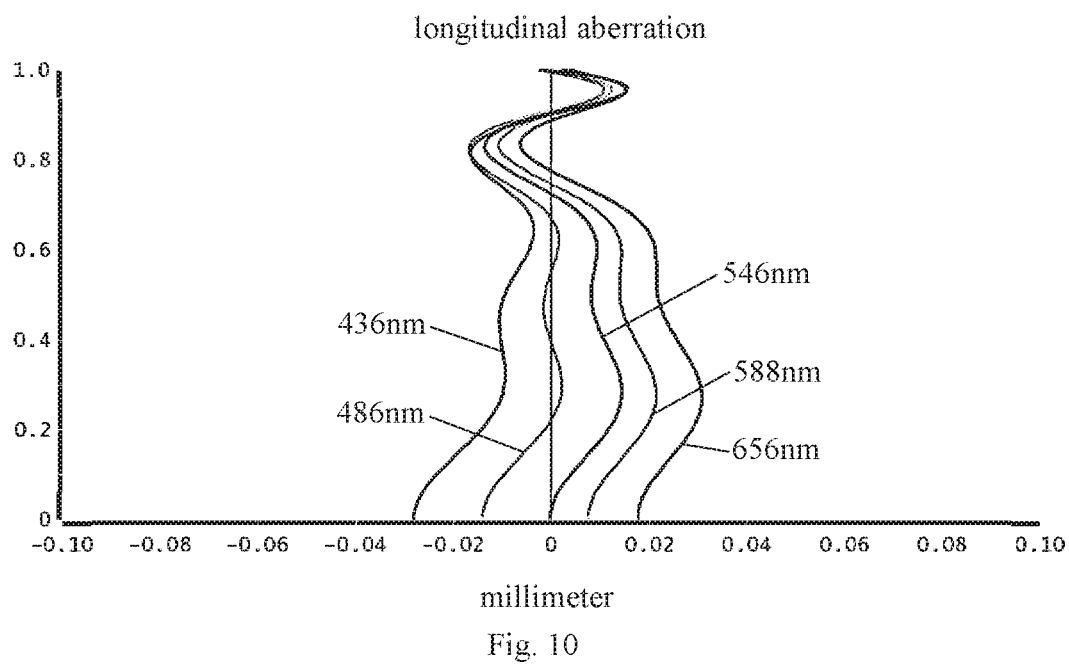
FIG. 10 is a schematic diagram of a longitudinal aberration of the camera optical lens shown in FIG. 9.
Figure 11:
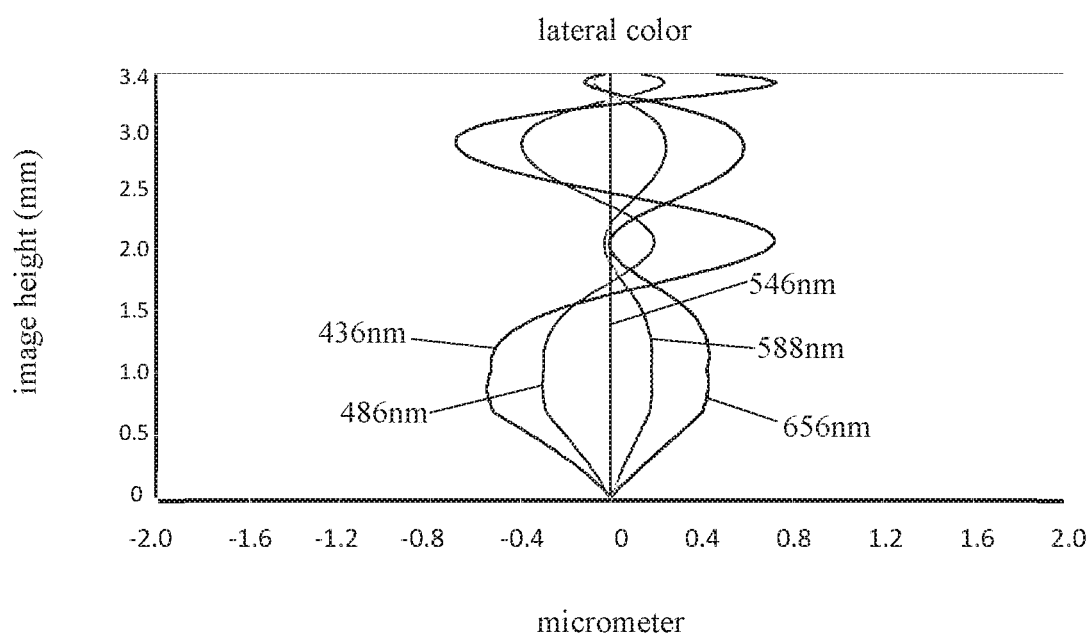
FIG. 11 is a schematic diagram of a lateral color of the camera optical lens shown in FIG. 9.
Figure 12:
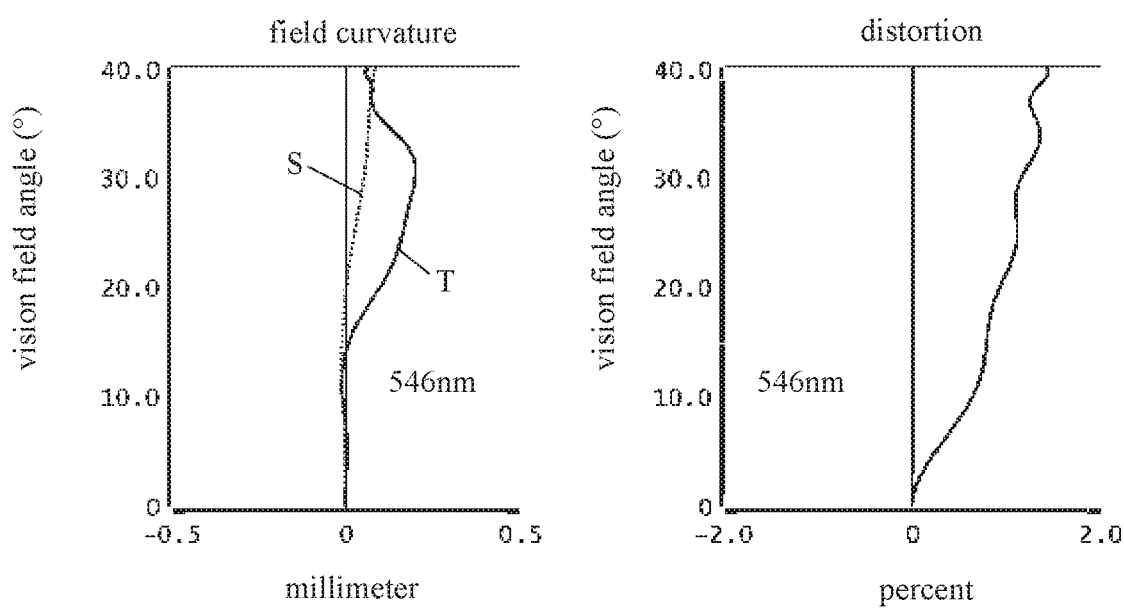
FIG. 12 is a schematic diagram of a field curvature and a distortion of the camera optical lens shown in FIG. 9.

FIG. 10 and FIG. 11 respectively illustrate a longitudinal aberration and a lateral color of light with wavelengths of 436 nm, 486 nm, 546 nm, 588 nm and 656 nm after passing the camera optical lens 30 according to Embodiment 3. FIG. 12 illustrates a field curvature and a distortion of light with a wavelength of 546 nm after passing the camera optical lens 30 according to Embodiment 3, in which a field curvature S is a field curvature in a sagittal direction and T is a field curvature in a tangential direction.

Table 13 in the following lists values corresponding to the respective conditions in this embodiment in order to satisfy the above conditions.

In this embodiment, the entrance pupil diameter of the camera optical lens is 2.474 mm. The image height of 1.0H is 3.400 mm. The FOV is 80.00°. Thus, the camera optical lens has a wide-angle and is ultra-thin. Its on-axis and off-axis chromatic aberrations are fully corrected, thereby achieving excellent optical characteristics.

TABLE 13

| Parameters and conditions | Embodiment 1 | Embodiment 2 | Embodiment 3 |
|---|---|---|---|
| f | 4.052 | 4.057 | 3.959 |
| f1 | 7.740 | 6.142 | 9.866 |
| f2 | 4.816 | 4.022 | 4.833 |
| f3 | −7.527 | −5.386 | −48989.425 |
| f4 | −20.576 | −224.425 | −24556.181 |
| f5 | 9.905 | −43.276 | −5.986 |
| f6 | −19.458 | 14.321 | 20.320 |
| f7 | −17.107 | −7.651 | −154.373 |
| f12 | 3.153 | 2.698 | 3.493 |
| FNO | 1.60 | 1.60 | 1.60 |
| f1/f | 1.91 | 1.51 | 2.49 |
| n5 | 1.81 | 1.71 | 2.12 |
| f3/f4 | 0.37 | 0.02 | 1.99 |
| (R13 + R14)/(R13 − R14) | 5.66 | 3.08 | 9.95 |
| n6 | 1.81 | 1.71 | 2.12 |

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A camera optical lens, comprising, from an object side to an image side in sequence: a first lens, a second lens, a third lens, a fourth lens, a fifth lens, a sixth lens and a seventh lens, and at least one of the lenses has an inflection point on object side surface and/or image side surface; wherein the camera optical lens satisfies the following conditions:

$$1.51 \leq f1/f \leq 2.50;$$

$$1.70 \leq n5 \leq 2.20;$$

$$0.00 \leq f3/f4 \leq 2.00;$$

$$3.00 \leq (R13+R14)/(R13-R14) \leq 10.00; \text{ and}$$

$$1.70 \leq n6 \leq 2.20;$$

where,
f: a focal length of the optical camera lens;
f1: a focal length of the first lens;
f3: a focal length of the third lens;
f4: a focal length of the fourth lens;
n5: a refractive index of the fifth lens;
n6: a refractive index of the sixth lens;
R13: a curvature radius of an object side surface of the seventh lens; and
R14: a curvature radius of an image side surface of the seventh lens.

2. The camera optical lens according to claim 1 further satisfying the following conditions:

$$1.71 \leq n5 \leq 2.16;$$

$$0.01 \leq f3/f4 \leq 2.00;$$

$$3.04 \leq (R13+R14)/(R13-R14) \leq 9.98; \text{ and}$$

$$1.71 \leq n6 \leq 2.16.$$

3. The camera optical lens according to claim 1, wherein, the first lens has a positive refractive power with a convex object side surface in a paraxial region and a concave image side surface in the paraxial region; the camera optical lens further satisfies the following conditions:

$$-11.43 \leq (R1+R2)/(R1-R2) \leq -1.55; \text{ and}$$

$$0.04 \leq d1/TTL \leq 0.14;$$

where,
R1: a curvature radius of the object side surface of the first lens;
R2: a curvature radius of the image side surface of the first lens;
d1: an on-axis thickness of the first lens; and
TTL: a total optical length from the object side surface of the first lens of the camera optical lens to an image surface of the camera optical lens along an optical axis.

4. The camera optical lens according to claim 3 further satisfying the following conditions:

$$-7.14 \leq (R1+R2)/(R1-R2) \leq -1.93; \text{ and}$$

$$0.06 \leq d1/TTL \leq 0.11.$$

5. The camera optical lens according to claim 1, wherein, the second lens has a positive refractive power with a convex object side surface in a paraxial region; the camera optical lens further satisfies the following conditions:

$$0.50 \leq f2/f \leq 1.83;$$

$$-2.43 \leq (R3+R4)/(R3-R4) \leq 0.76; \text{ and}$$

$$0.05 \leq d3/TTL \leq 0.15;$$

where,
f2: a focal length of the second lens;
R3: a curvature radius of the object side surface of the second lens;
R4: a curvature radius of an image side surface of the second lens;
d3: an on-axis thickness of the second lens; and
TTL: a total optical length from an object side surface of the first lens of the camera optical lens to an image surface of the camera optical lens along an optical axis.

6. The camera optical lens according to claim 5 further satisfying the following conditions:

$$0.79 \leq f2/f \leq 1.46;$$

$$-1.52 (R3+R4)/(R3-R4) \leq 0.61; \text{ and}$$

$$0.08 \leq d3/TTL \leq 0.12.$$

7. The camera optical lens according to claim 1, wherein, the third lens has a negative refractive power with a concave object side surface in a paraxial region; and the camera optical lens further satisfies the following conditions:

$$f3/f \leq -0.89;$$

$$-156.49 \leq (R5+R6)/(R5-R6) \leq 0.25; \text{ and}$$

$$0.02 \leq d5/TTL \leq 0.07;$$

where,
R5: a curvature radius of the object side surface of the third lens;
R6: a curvature radius of an image side surface of the third lens;
d5: an on-axis thickness of the third lens; and
TTL: a total optical length from an object side surface of the first lens of the camera optical lens to an image surface of the camera optical lens along an optical axis.

8. The camera optical lens according to claim 7 further satisfying the following conditions:

$$f3/f \leq -1.11;$$

$$-97.81 \leq (R5+R6)/(R5-R6) \leq 0.20; \text{ and}$$

$$0.03 \leq d5/TTL \leq 0.06.$$

9. The camera optical lens according to claim 1, wherein, the fourth lens has a negative refractive power with a concave object side surface in a paraxial region and a convex image side surface in the paraxial region; the camera optical lens further satisfies the following conditions:

$$f4/f \leq -3.39;$$

$$-118.35 \leq (R7+R8)/(R7-R8) \leq -1.91; \text{ and}$$

$$0.03 \leq d7/TTL \leq 0.10;$$

where,
R7: a curvature radius of the object side surface of the fourth lens;
R8: a curvature radius of the image side surface of the fourth lens;
d7: an on-axis thickness of the fourth lens; and
TTL: a total optical length from an object side surface of the first lens of the camera optical lens to an image surface of the camera optical lens along an optical axis.

10. The camera optical lens according to claim 9 further satisfying the following conditions:

$$f4/f \leq -4.23;$$

$$-73.97 \leq (R7+R8)/(R7-R8) \leq -2.38; \text{ and}$$

$$0.05 \leq d7/TTL \leq 0.08.$$

11. The camera optical lens according to claim 1, wherein, the fifth lens has a refractive power with a concave object side surface in a paraxial region; the camera optical lens further satisfies the following conditions:

$$-21.33 \leq f5/f \leq 3.67;$$

$$-18.44 \leq (R9+R10)/(R9-R10) \leq 2.66; \text{ and}$$

$$0.03 \leq d9/TTL \leq 0.10;$$

where,
f5: a focal length of the fifth lens;
R9: a curvature radius of the object side surface of the fifth lens;
R10: a curvature radius of an image side surface of the fifth lens;
d9: an on-axis thickness of the fifth lens; and
TTL: a total optical length from an object side surface of the first lens of the camera optical lens to an image surface of the camera optical lens along an optical axis.

12. The camera optical lens according to claim 11 further satisfying the following conditions:

$$-13.33 \leq f5/f \leq 2.93;$$

$$-11.52 \leq (R9+R10)/(R9-R10) \leq 2.13; \text{ and}$$

$$0.05 \leq d9/TTL \leq 0.08.$$

13. The camera optical lens according to claim 1, wherein, the sixth lens has a refractive power with a convex object side surface in a paraxial region and a concave image side surface in the paraxial region; the camera optical lens further satisfies the following conditions:

$$-9.60 \leq f6/f \leq 7.70;$$

$$-25.72 \leq (R11+R12)/(R11-R12) \leq 15.10; \text{ and}$$

$$0.03 \leq d11/TTL \leq 0.12;$$

where,
f6: a focal length of the sixth lens;
R11: a curvature radius of the object side surface of the sixth lens;
R12: a curvature radius of the image side surface of the sixth lens;
d11: an on-axis thickness of the sixth lens; and
TTL: a total optical length from an object side surface of the first lens of the camera optical lens to an image surface of the camera optical lens along an optical axis.

14. The camera optical lens according to claim 13 further satisfying the following conditions:

$-6.00 \leq f6/f \leq 6.16$;

$-16.07 \leq (R11+R12)/(R11-R12) \leq 12.08$; and $0.05 \leq d11/TTL \leq 0.10$.

15. The camera optical lens according to claim 1, wherein, the seventh lens has a negative refractive power, the object side surface of the seventh lens being convex in a paraxial region and the image side surface of the seventh lens being concave in the paraxial region; the camera optical lens further satisfies the following conditions:

$-77.99 \leq f7/f \leq -1.26$; and $0.07 \leq d13/TTL \leq 0.26$;

where,
f7: a focal length of the seventh lens;
d13: an on-axis thickness of the seventh lens; and
TTL: a total optical length from an object side surface of the first lens of the camera optical lens to an image surface of the camera optical lens along an optical axis.

16. The camera optical lens according to claim 15 further satisfying the following conditions:

$-48.74 \leq f7/f \leq -1.57$; and $0.12 \leq d13/TTL \leq 0.21$.

17. The camera optical lens as described in claim 1, wherein a total optical length from an object side surface of the first lens of the camera optical lens to an image surface of the camera optical lens along an optical axis is less than or equal to 5.79 millimeters.

18. The camera optical lens as described in claim 17, wherein the total optical length from the object side surface of the first lens of the camera optical lens to the image surface of the camera optical lens along the optical axis is less than or equal to 5.52 millimeters.

19. The camera optical lens as described in claim 1, wherein an F number of the camera optical lens is less than or equal to 1.65.

20. The camera optical lens as described in claim 19, wherein the F number of the camera optical lens is less than or equal to 1.62.

\* \* \* \* \*